US012100320B1

(12) United States Patent
Krantz

(10) Patent No.: US 12,100,320 B1
(45) Date of Patent: Sep. 24, 2024

(54) BILLBOARD ADVERTISING STRUCTURE

(71) Applicant: Scott Krantz, Tarzana, CA (US)

(72) Inventor: Scott Krantz, Tarzana, CA (US)

( * ) Notice: Subject to any disclaimer, the term of this patent is extended or adjusted under 35 U.S.C. 154(b) by 0 days.

(21) Appl. No.: 18/442,513

(22) Filed: Feb. 15, 2024

Related U.S. Application Data

(60) Provisional application No. 63/622,685, filed on Jan. 19, 2024.

(51) Int. Cl.
*G09F 9/30* (2006.01)
*G06F 3/14* (2006.01)
*G06Q 30/0241* (2023.01)

(52) U.S. Cl.
CPC .............. *G09F 9/30* (2013.01); *G06F 3/14* (2013.01); *G06Q 30/0241* (2013.01)

(58) Field of Classification Search
CPC .......... G09F 9/30; G06F 3/14; G06Q 30/0241
See application file for complete search history.

(56) References Cited

U.S. PATENT DOCUMENTS

| 7,098,870 | B2 * | 8/2006 | Wampler | G06F 3/1438 |
| | | | | 715/744 |
| 10,175,926 | B1 * | 1/2019 | Ezzahid | G06Q 30/0241 |
| 10,741,108 | B2 * | 8/2020 | Carolan | G09F 15/005 |
| 11,163,515 | B2 * | 11/2021 | Kruse | G06F 3/1438 |
| 11,257,120 | B2 * | 2/2022 | Maliszewski | G06Q 10/083 |
| 11,481,173 | B2 * | 10/2022 | Ichikawa | G06Q 30/0265 |
| 11,790,401 | B2 * | 10/2023 | Pittman | G06Q 30/0264 |
| | | | | 705/14.43 |
| 11,828,613 | B2 * | 11/2023 | Miyake | G01C 21/3632 |
| 12,002,357 | B2 * | 6/2024 | Clifford | G08G 1/096783 |
| 2010/0223112 | A1 * | 9/2010 | Griffin | G06Q 30/02 |
| | | | | 705/14.4 |
| 2011/0231231 | A1 * | 9/2011 | Cruz | G06Q 30/02 |
| | | | | 705/14.4 |
| 2016/0307476 | A1 * | 10/2016 | Cox | G09F 15/0018 |
| 2023/0025590 | A1 * | 1/2023 | Yamazaki | G06V 10/60 |

* cited by examiner

*Primary Examiner* — Vinh T Lam
(74) *Attorney, Agent, or Firm* — Clark Hill PLC; James R. Foley

(57) ABSTRACT

A billboard advertising structure that has a first digital screen on the front and a second digital screen on the back. A computer is in communication with the digital screens. At least one sensor is in communication with the computer. The computer uses the at least one sensor to collect information from outside the billboard advertising structure. A data transmitter is configured to transmit data and a data receiver is configured to receive commands. The computer preferably considers the information that was received via the at least one sensor to determine what should be displayed on either or both digital screens and/or to adjust the brightness of the screens. The billboard advertising structure could be mounted to a median with traffic on each side and could be one of a plurality mounted to the median. Instead of having digital screens, the billboard advertising structure could have conventional display surfaces.

16 Claims, 5 Drawing Sheets

BILLBOARD ADVERTISING STRUCTURE

RELATED APPLICATION (PRIORITY CLAIM)

This application claims the benefit of U.S. Provisional Application Ser. No. 63/622,685, filed Jan. 19, 2024, which is hereby incorporated herein by reference in its entirety.

BACKGROUND

The present invention relates generally to billboards and digital screens used for advertising, such as billboards and digital screens that are positioned on buildings and along the sides of highways for advertising purposes.

The present invention relates more specifically to a billboard advertising structure being positioned on a median, between lanes of traffic.

Traditional methods of outdoor advertising have predominantly involved non-digital billboards and digital screens positioned on high buildings or by the roadside. These conventional approaches have several limitations and disadvantages.

As an illustration, the traditional method of positioning billboards and digital screens on tall structures or alongside roads has frequently faced limitations related to location and visibility. In particular, visibility is commonly hindered by urban elements like trees, buildings, or other structures. The conventional placement also limits the reach of the audience, especially in densely populated areas.

Moreover, the traditional method of positioning billboards and digital screens on tall structures or alongside roads frequently leads to restricted space and scalability. The available building facades or designated roadside areas constrain the physical space for traditional billboards. This constraint limits both the quantity and dimensions of advertisements that can be showcased in a specific area, ultimately diminishing scalability and flexibility.

Conventional billboards, due to their placement, require drivers to shift line of sight away from the roadway in order to view the content, thereby contributing to driver distraction.

Furthermore, conventional billboards compensate for distance from the roadway by increasing scale. As such, conventional billboards must be relatively large.

Moreover, traditional billboards exist as independent structures. Consequently, they do not seamlessly integrate with broader urban infrastructure elements, such as traffic management, public announcements, or emergency alerts.

Furthermore, conventional billboards frequently contribute to aesthetic disruption, being perceived as visual clutter that diminishes the overall appeal of urban landscapes. They have the tendency to overshadow architectural features and disrupt the visual harmony of cityscapes.

In addition, traditional billboards lack data collection capabilities. This deficiency means they cannot provide any feedback, such as insights into viewer engagement or effectiveness. The absence of data makes it challenging to measure impact or gather valuable insights for future marketing strategies.

SUMMARY

An object of an embodiment of the present invention is to provide a billboard advertising structure which enhances visibility and reach. Specifically, preferably the structure is designed to be prominently visible from multiple angles and distances, ensuring high exposure to vehicular and pedestrian traffic. Preferably, the billboard advertising structure is placed in a center median, thereby offering a unique vantage point not utilized by traditional advertising methods.

Another object of an embodiment of the present invention is to provide a billboard advertising structure which provides dynamic content management. Preferably, the structure is configured to display a range of content—from traditional advertisements to public service announcements and real-time information—with the flexibility to change content swiftly and remotely, catering to the dynamic nature of urban environments.

Still another object of an embodiment of the present invention is to provide a billboard advertising structure which has a customizable design. Preferably, the design of the structure is adaptable to complement the aesthetic and architectural character of different urban landscapes, making it an integral part of the cityscape rather than an intrusive element.

Yet another object of an embodiment of the present invention is to provide a billboard advertising structure which is configured to provide data-driven insights. Specifically, preferably the structure is equipped with data collection capabilities, such that the structure can gather valuable insights on audience demographics, engagement levels, and traffic patterns, aiding advertisers in targeted marketing and helping city planners in traffic management.

Still yet another object of an embodiment of the present invention is to provide a billboard advertising structure which is scalable, flexible, and expandable into different areas and adaptable for various sizes and types of median strips.

Still yet another object of an embodiment of the present invention is to provide a billboard advertising structure which is modular in that the height can be easily increased during installation merely by using an extra base.

Briefly, an embodiment of the present invention provides a billboard advertising structure that has a front and a back. A first digital screen is on the front and a second digital screen is on the back. A computer is in communication with the first digital screen and the second digital screen. At least one sensor is in communication with the computer. The computer uses the at least one sensor to collect information from outside the billboard advertising structure. A data transmitter is configured to transmit data outside the billboard advertising structure and a data receiver is configured to receive commands from outside the billboard advertising structure.

A single data transmitter/receiver device could comprise both the data transmitter and the data receiver. The at least one sensor could comprise one or more of the following: a proximity sensor, a camera and a video camera. If the at least one sensor includes a proximity sensor, the proximity sensor could be inductive, capacitive, ultrasonic, photoelectric, magnetic, or hall effect.

The computer preferably considers the information that was received via the at least one sensor to determine what should be displayed on the first digital screen and/or the second digital screen. The computer could also, or in the alternative, considers the information to adjust the brightness of the first digital screen and/or the second digital screen. The digital screens could be, for example, LCD or LED screens.

The billboard advertising structure could be mounted to a median with traffic on each side. In fact, the billboard advertising structure could be one of a plurality billboard advertising structures mounted to the median.

Instead of having digital screens, the billboard advertising structure that is mounted to the median could having conventional display surfaces thereby eliminating the need for a computer, etc.

BRIEF DESCRIPTION OF THE DRAWINGS

The organization and manner of the structure and operation of the invention, together with further objects and advantages thereof, may best be understood by reference to the following description taken in connection with the accompanying drawings wherein like reference numerals identify like elements in which.

DESCRIPTION

Figure 1:
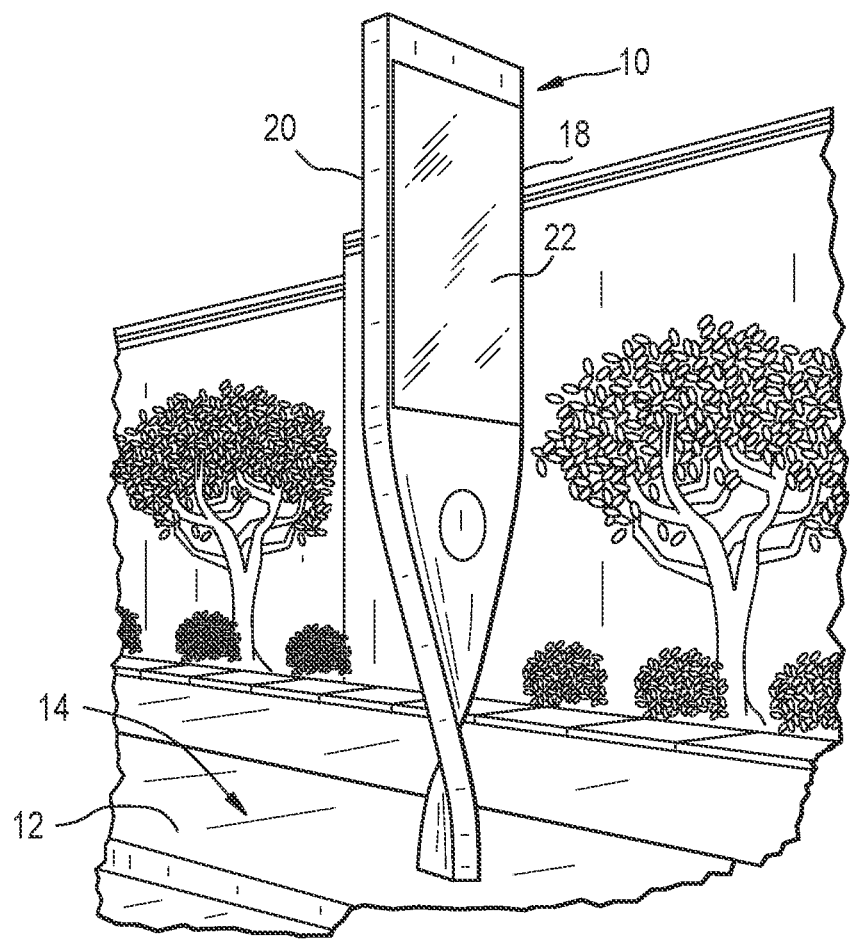
FIG. 1 is perspective view showing a billboard advertising structure in accordance with an embodiment of the present invention, showing the structure on a median.

While this invention may be susceptible to embodiment in different forms, there are shown in the drawings and will be described herein in detail, specific embodiments with the understanding that the present disclosure is to be considered an exemplification of the principles of the invention and is not intended to limit the invention to that as illustrated.

FIG. 1 illustrates a billboard advertising structure 10 that is in accordance with an embodiment of the present invention. As shown, the billboard advertising structure 10 is an erect structure that is mounted to the ground 12. The mounting could be, for example, bolts going through bores in a base of the billboard advertising structure 10 and extending into concrete, or the bottom of the billboard advertising structure could be embedded in concrete. While the shape of billboard advertising structure is shown as being twisted to get it a contemporary appearance, it could take many different shapes and still stay within the scope of the present invention.

Figure 2:
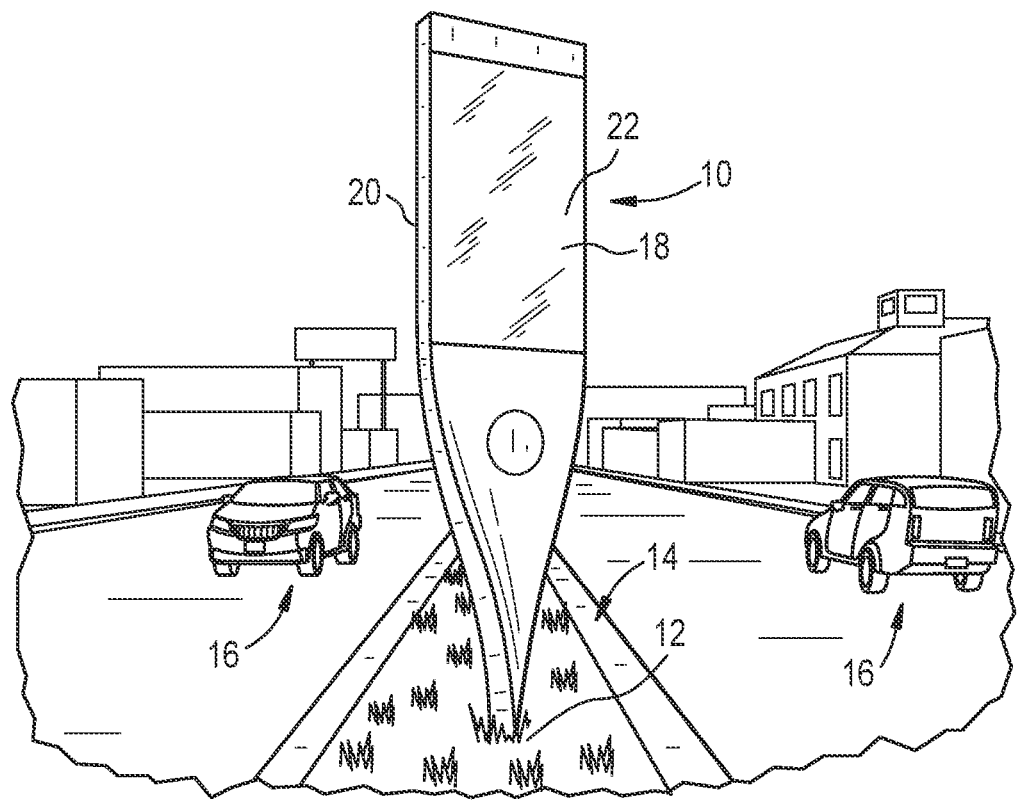
FIG. 2 is another view, similar to FIG. 1, but showing the billboard advertising structure head on, and showing traffic going in opposite directions along each side of the median.
Figure 3:
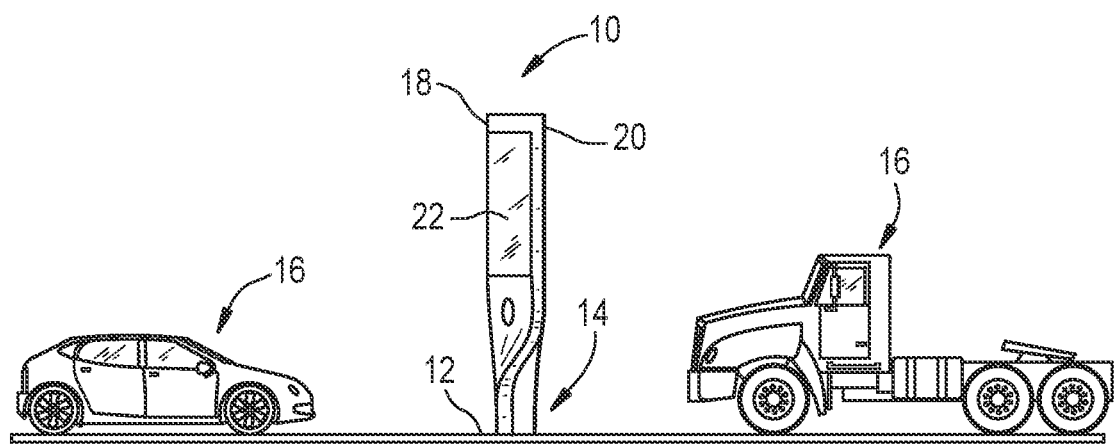
FIG. 3 provides two views—an upper view showing the billboard advertising structure from the side and showing traffic approaching from both the front and the back, and a lower view showing the billboard advertising structure head on and showing traffic going along both sides.
Figure 3:
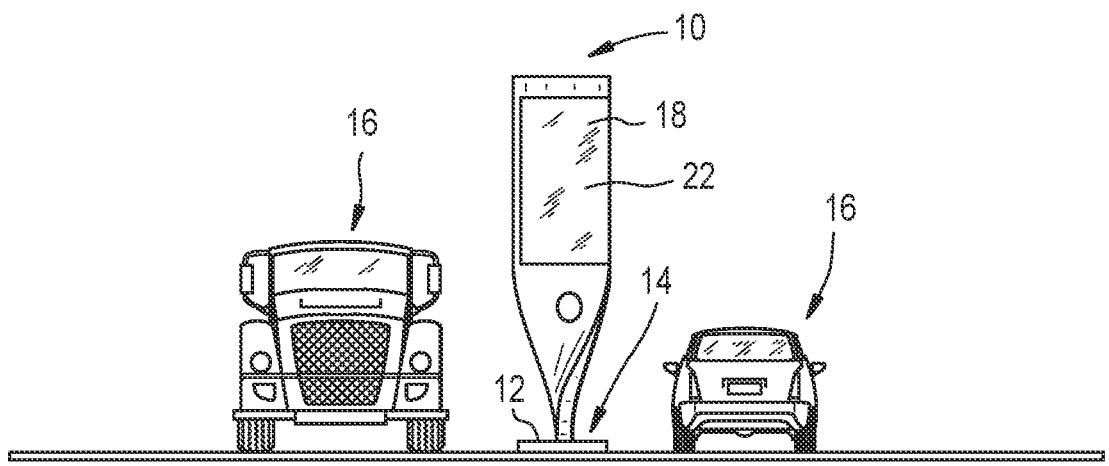

Regardless, preferably the ground 12 to which the billboard advertising structure 10 is mounted comprises a median 14 which, as shown more clearly in FIGS. 2 and 3, has vehicular traffic 16 along both sides. More specifically, preferably traffic 16 travels from both directions relative to the billboard advertising structure 10.

The top view of FIG. 3 shows the median 14 and billboard advertising structure 10 from the side. As shown, traffic 16 approaches the billboard advertising structure 10 from both the front 18 and the back 20.

The bottom view of FIG. 3 is consistent with what is shown in FIG. 2 and shows the median 14 and billboard advertising structure 10 head on. As shown, traffic 16 passes along each side, going in opposite directions.

The billboard advertising structure 10 has a surface on both the front 18 and the back 20 which displays information. In other words, preferably each one of the front 18 and the back 20 of the billboard advertising structure 10 comprises an information-displaying screen or surface. Most preferably, each surface comprises a digital screen 22 that, for example, cycles through programmed content.

Figure 5:
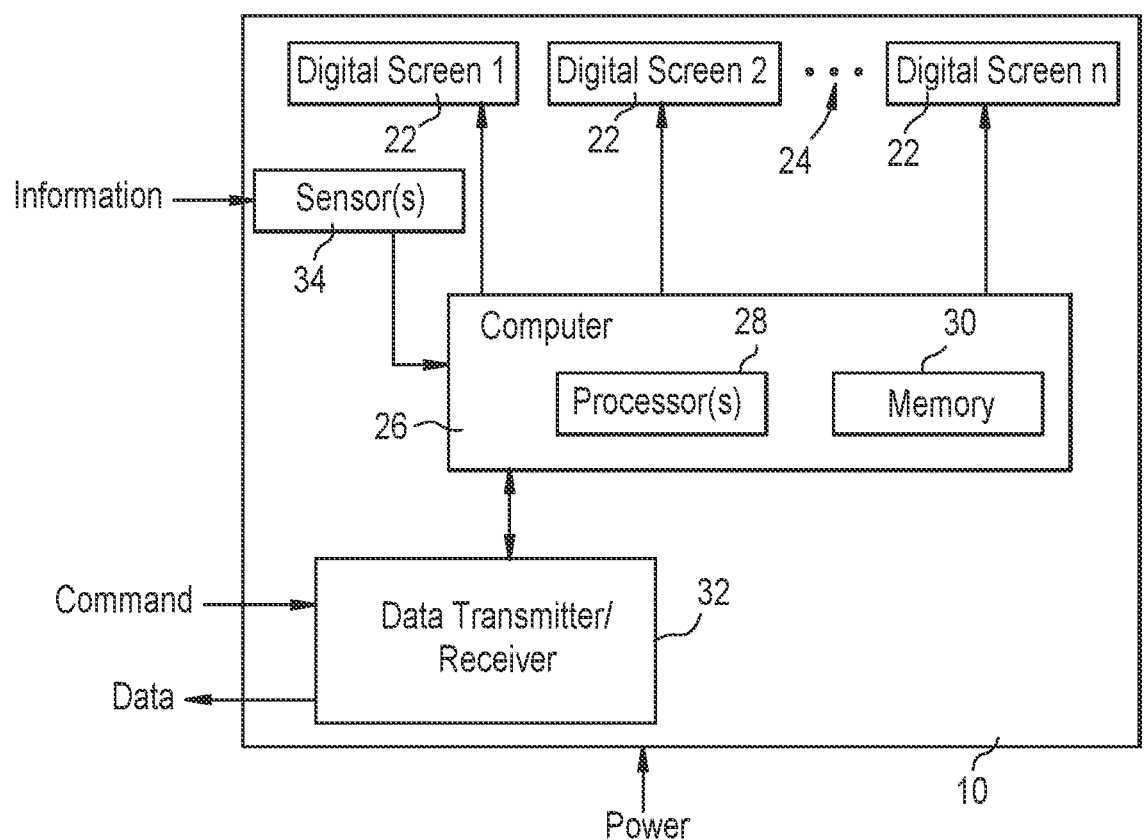
FIG. 5 is a block diagram of the billboard advertising structure not only illustrating some of its internal components but also illustrating its connectivity to a network (i.e., via a data transmitter and/or receiver).

FIG. 5 is a block diagram which shows some of the components of a specific, preferred embodiment of the billboard advertising structure. As shown, the billboard advertising structure 10 comprises multiple digital screens 22, such as LED or LCD screens. If one digital screen 22 is provided on the front 18 of the billboard advertising structure 10 and one digital screen 22 is provided on the back 20 of the billboard advertising structure 10, then there would be two screens, but as shown in FIG. 5 more than two digital screens are entirely possible (as represented by the three dots 24 and the fact that the one digital screen is named "Digital Screen n".

As shown, preferably the billboard advertising structure 10 also comprises a computer 26 that includes one or more processors 28 and memory 30. Preferably, the billboard advertising structure also comprises a data transmitter and/or receiver 32 (preferably both, either combined or as separate units). As such, the billboard advertising structure 10 can send data to a remote location and receive commands from that remote location (or a different location). The billboard advertising structure 10 also preferably comprises one or more sensors 34 which receives information from outside the billboard advertising structure and is used by the computer 26 to collect data. Some or all of this data is then preferably transmitted outside the billboard advertising structure 10 using the data transmitter 32. As shown in FIG. 5, the billboard advertising structure 10 preferably receives power from outside the billboard advertising structure 10. However, the billboard advertising structure 10 could also be solar powered.

The data transmitter/receiver 32 could be configured to communicate via cellular, cable, optical, radio frequency, Wi-Fi, Bluetooth®, or any other appropriate means. The sensor(s) 34 could take many forms, such as, for example, a proximity sensor (i.e., inductive, capacitive, ultrasonic, photoelectric, magnetic, hall effect, etc.), a camera, a video camera, or any other appropriate structure. Regardless, preferably the computer 26 uses the sensor(s) 34 to collect information regarding the outside world, processes the data, stores at least some of this data in memory 30, and uses the data transmitter 32 to transmit at least some of the processed and saved data to a remote location for further processing and/or analysis.

Preferably, commands are received by the billboard advertising structure 10 using the data receiver 32 and these commands dictate, for example, what the computer displays on the digital screens 22.

The computer 26 could also be configured to control the content, the brightness, etc., of the digital screens 22 based on what is sensed by the sensor(s) 34.

Preferably, the billboard advertising structure 10 is configured to have a modular frame design wherein the frameworks feature a modular design, facilitating effortless assembly, disassembly, and size adjustments. This modular approach allows for customization to accommodate various median widths and lengths, permitting scalable installations ranging from single-screen setups to interconnected multiple units.

Also, preferably, the billboard advertising structure 10 is equipped with advanced display technology wherein each structure is equipped with cutting-edge digital display technology. This encompasses choices between LED or LCD screens capable of delivering high-resolution, bright, and clear images visible even in direct sunlight. For non-digital options, preferably innovative materials are utilized to ensure high visibility.

Preferably, the billboard advertising structure 10 provides smart technology integration in that it is infused with smart technology, allowing the structure to seamlessly connect to the internet and city infrastructure. This connectivity enables real-time content updates, interactivity, data collection, and synchronization with other city systems.

Preferably, the billboard advertising structure 10 has an aesthetically pleasing design. Beyond mere functionality, preferably the billboard advertising structure showcases an aesthetically pleasing design that seamlessly blends into the urban landscape, enhancing the visual allure of the streets.

Preferably, the billboard advertising structure 10 provides dual-facing high-resolution displays. The billboard advertising structure could feature both digital and non-digital displays with the capability to showcase high-resolution images. Positioned within center medians, these displays are dual-facing, guaranteeing visibility from both sides of traffic. This design maximizes exposure to commuters and pedestrians along bustling surface streets.

Figure 4:
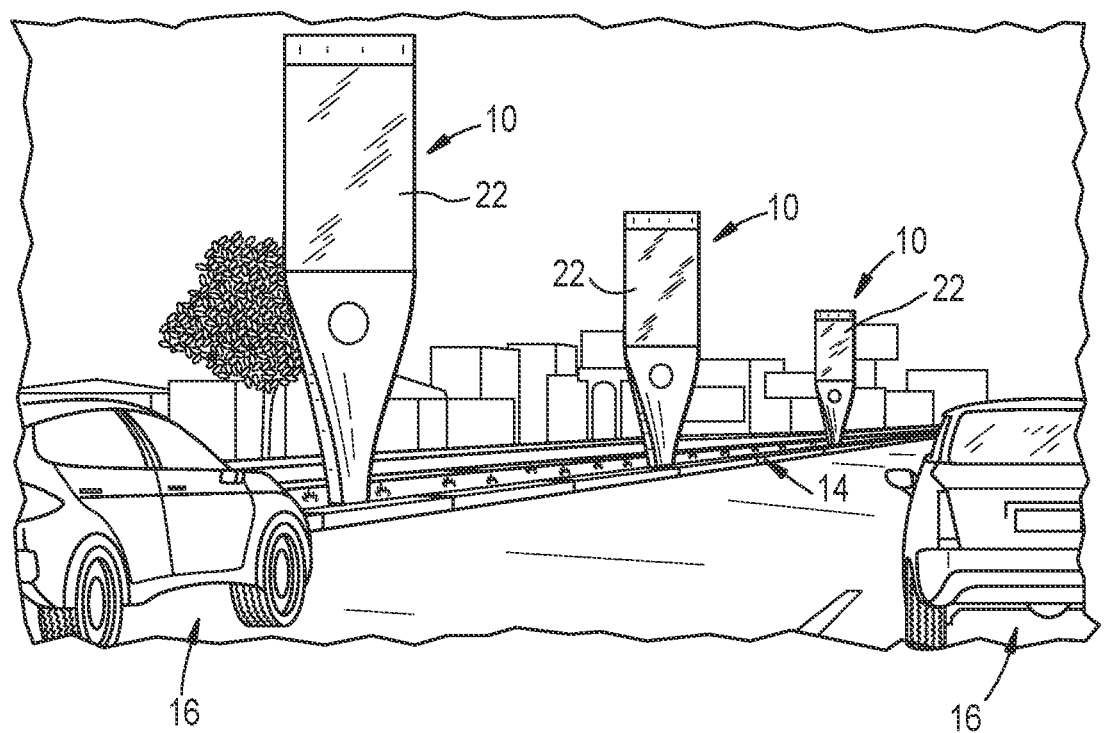
FIG. 4 shows multiple billboard advertising structures on a single median, in accordance with an embodiment of the present invention.

As shown in FIG. 4, one embodiment of the present invention provides for multiple synchronized billboard advertising structures wherein multiple, synchronized digital structures are used within a single median 16 (or across multiple medians). These structures can display the same message simultaneously, creating a cohesive and impactful advertising experience. This synchronization ensures that the message is consistently delivered to commuters traveling in both directions.

Overall, the billboard advertising structures could be configured to provide an integrated traffic and public information system. Specifically, beyond advertising, these structures can integrate with city traffic control systems to display real-time traffic updates, public announcements, or emergency alerts, adding a public service dimension to their functionality.

Preferably, each billboard advertising structure 10 has a customizable modular design that allows for customization in size and shape to fit different median sizes and city aesthetics, making them adaptable to various urban environments.

As a result of being equipped with one or more sensors 34, the billboard advertising structure 10 provides for smart data collection. As such, it can collect valuable data on traffic patterns and advertisement engagement, providing insights for advertisers and city planners.

The billboard advertising structure 10 is preferably configured for aesthetic integration with urban landscape in that it is designed not just for functionality but also to enhance the visual appeal of the urban landscape, possibly featuring artistic elements or blending with the surrounding architecture.

The billboard advertising structure 10 is preferably configured for seamless urban integration in that it can seamlessly blend with the urban landscape, elevating the visual appeal of city streets. In contrast to conventional billboards that can be intrusive, preferably the billboard advertising structure 10 is crafted to harmonize with their surroundings.

The billboard advertising structure 10 provides for enhanced data analytics capabilities. As a result of incorporating one or more sensors and smart technology, each structure provides valuable data analytics. This empowers advertisers to assess the effectiveness of their campaigns and offers insights for city planning and traffic management.

The billboard advertising structure 10 provides for increased advertising real estate. Specifically, the dual-sided configuration and the potential for multiple synchronized structures in a single installation (see FIG. 4) expand the available advertising real estate. This provides advertisers with more opportunities within the constraints of limited urban space.

The billboard advertising structure 10 allows for versatile placement options, namely the adaptability to be positioned in various urban settings, including areas where traditional billboards are impractical. This potentially works to create new advertising markets and opportunities.

The billboard advertising structure 10 provides enhanced visibility and reach in that it is crafted to be prominently visible from multiple perspectives and distances, ensuring extensive exposure to both vehicular and pedestrian traffic. Placed within center medians, it provides a unique vantage point not typically utilized by conventional advertising methods.

The billboard advertising structure 10 provides the possibility of dynamic content management, having the capability to showcase a diverse range of content—from traditional advertisements to public service announcements and real-time information. The flexibility to swiftly and remotely change content caters to the dynamic nature of urban environments.

The billboard advertising structure 10 preferably has a customizable design wherein the design is flexible, allowing it to harmonize with the aesthetic and architectural characteristics of different urban landscapes. This adaptability positions the billboard advertising structure as an integral part of the cityscape rather than an intrusive element.

With built-in data collection capabilities, the billboard advertising structure 10 can be used to gather valuable insights on audience demographics, engagement levels, and traffic patterns. This aids advertisers in targeted marketing and assists city planners in effective traffic management.

The billboard advertising structure 10 is preferably scalable, with the potential for expansion into different areas, and it is adaptable to various sizes and types of median strips.

The billboard advertising structure 10 communicates without requiring drivers to shift line of sight away from the roadway, thereby reducing driver distraction caused by traditional billboard advertising.

Furthermore, while traditional billboards compensate for distance from the roadway by increasing scale, the billboard advertising structure 10 allows the sign to remain smaller but communicate as effectively as a much larger traditional billboard.

The billboard advertising structure 10 also gives local authorities the ability to divert traffic almost instantaneously to aid in traffic flow and to warn of emergency situations in a uniquely effective manner.

Preferably, the billboard advertising structure 10 is modular. Specifically, the height can be adjusted simply by adding a larger base.

While specific embodiments of the invention have been shown and described, it is envisioned that those skilled in the art may devise various modifications without departing from the spirit and scope of the present invention.

What is claimed is:

1. A billboard advertising structure comprising: a front and a back; a first digital screen on the front of the billboard advertising structure; a second digital screen on the back of the billboard advertising structure; a computer in communication with the first digital screen and the second digital screen; at least one sensor in communication with the computer, wherein the computer uses the at least one sensor to collect information from outside the billboard advertising structure; a data transmitter configured to transmit data outside the billboard advertising structure; a data receiver configured to receive commands from outside the billboard advertising structure.

2. A billboard advertising structure as recited in claim 1, wherein a data transmitter/receiver comprises the data transmitter and the data receiver.

3. A billboard advertising structure as recited in claim 1, wherein the at least one sensor comprises at least one of a proximity sensor, a camera and a video camera.

4. A billboard advertising structure as recited in claim 3, wherein the proximity sensor comprises at least one of an inductive proximity sensor, capacitive proximity sensor, ultrasonic proximity sensor, photoelectric proximity sensor, magnetic proximity sensor, and hall effect proximity sensor.

5. A billboard advertising structure as recited in claim 1, wherein the computer comprises at least one processor and memory.

6. A billboard advertising structure as recited in claim 1, wherein the billboard advertising structure is mounted to a median with traffic on each side.

7. A billboard advertising structure as recited in claim 1, wherein the billboard advertising structure is one of a plurality billboard advertising structures mounted to a median with traffic on each side.

8. A billboard advertising structure as recited in claim 1, wherein the computer considers the information that was received via the at least one sensor to determine what should be displayed on at least of the first digital screen and the second digital screen.

9. A billboard advertising structure as recited in claim 1, wherein the computer considers the information that was received via the at least one sensor to adjust the brightness of at least of the first digital screen and the second digital screen.

10. A billboard advertising structure as recited in claim 1, wherein the first digital screen comprises at least one of an LCD screen and an LED screen, and wherein the second digital screen comprises at least one of an LCD screen and an LED screen.

11. A billboard advertising structure mounted on a median with traffic along each side of the median, said billboard advertising structure comprising: a front and a back; a first display on the front of the billboard advertising structure; and a second display on the back of the billboard advertising structure, wherein the billboard advertising structure comprises a base which is mounted on the median with traffic along each side of the median.

12. A billboard advertising structure as recited in claim 11, wherein the first display comprises a first digital screen, wherein the second display comprises a second digital screen.

13. A billboard advertising structure mounted on a median with traffic along each side of the median, said billboard advertising structure comprising: a front and a back; a first display on the front of the billboard advertising structure; and a second display on the back of the billboard advertising structure, wherein the first display comprises a first digital screen, wherein the second display comprises a second digital screen, further comprising a computer in communication with the first digital screen and the second digital screen; at least one sensor in communication with the computer, wherein the computer uses the at least one sensor to collect information from outside the billboard advertising structure; a data transmitter configured to transmit data outside the billboard advertising structure; a data receiver configured to receive commands from outside the billboard advertising structure.

14. A plurality of billboard advertising structures mounted on a median with traffic along each side of the median, wherein each billboard advertising structure comprises: a front and a back; a first display on the front of the billboard advertising structure; and a second display on the back of the billboard advertising structure, wherein each of the billboard advertising structure comprises a base which is mounted on the median with traffic along each side of the median.

15. A plurality of billboard advertising structures mounted on a median with traffic along each side of the median, wherein each billboard advertising structure comprises: a front and a back; a first display on the front of the billboard advertising structure; and a second display on the back of the billboard advertising structure, wherein the first display of each billboard advertising structure comprises a first digital screen, wherein the second display of each billboard advertising structure comprises a second digital screen, wherein each billboard advertising structure comprises:

a computer in communication with the first digital screen and the second digital screen; at least one sensor in communication with the computer, wherein the computer uses the at least one sensor to collect information from outside the billboard advertising structure; a data transmitter configured to transmit data outside the billboard advertising structure; a data receiver configured to receive commands from outside the billboard advertising structure.

16. A billboard advertising system comprising: a median with traffic along each side of the median; and a plurality of billboard advertising structures mounted on the median, wherein each billboard advertising structure comprises displays, wherein the displays of the billboard advertising structures are synchronized.

\* \* \* \* \*